United States Patent
Leatherman, III (10) Patent No.: US 10,609,333 B2
(45) Date of Patent: Mar. 31, 2020

(54) SYSTEM FOR INTERACTIVE ONLINE COLLABORATION

(71) Applicant: Albert Roy Leatherman, III, Old Fields, WV (US)

(72) Inventor: Albert Roy Leatherman, III, Old Fields, WV (US)

( * ) Notice: Subject to any disclaimer, the term of this patent is extended or adjusted under 35 U.S.C. 154(b) by 0 days.

(21) Appl. No.: 16/278,098

(22) Filed: Feb. 17, 2019

(65) Prior Publication Data
US 2019/0260966 A1    Aug. 22, 2019

Related U.S. Application Data

(60) Provisional application No. 62/632,347, filed on Feb. 19, 2018.

(51) Int. Cl.
| | |
|---|---|
| *H04N 7/15* | (2006.01) |
| *H04L 12/18* | (2006.01) |
| *G06F 3/14* | (2006.01) |
| *G09B 5/10* | (2006.01) |
| *H04N 7/14* | (2006.01) |

(52) U.S. Cl.
CPC ........... *H04N 7/157* (2013.01); *G06F 3/1454* (2013.01); *G09B 5/10* (2013.01); *H04L 12/1822* (2013.01); *H04N 7/141* (2013.01)

(58) Field of Classification Search
CPC ...... H04N 7/157; G09B 5/10; H04L 12/1822; G06F 3/1454
See application file for complete search history.

(56) References Cited

U.S. PATENT DOCUMENTS

| | | | |
|---|---|---|---|
| 10,033,943 B1* | 7/2018 | Sharma .................. | H04N 5/272 |
| 2012/0221960 A1* | 8/2012 | Robinson .............. | G06F 3/0488 715/751 |
| 2014/0184721 A1* | 7/2014 | Zhang ...................... | H04N 7/15 348/14.02 |
| 2015/0180916 A1* | 6/2015 | Ahn ..................... | G06F 3/04845 715/273 |
| 2016/0373693 A1* | 12/2016 | Segal ....................... | H04N 7/15 |

* cited by examiner

*Primary Examiner* — Stella L. Woo (57) ABSTRACT

In the present invention the camera of a student's mobile communications device sends a live image of the student's paper through an image-sharing subsystem to the instructor's personal computing or mobile communications device. An annotation subsystem allows the instructor to mark said image of the student's paper, and a background-subtraction subsystem allows a background-free image of the instructor to appear on said image of the student's paper. A screen-sharing subsystem transmits a combined image of the student's paper and the instructor and his or her markings back to the student's device. Mounting the student's device above the paper on which he or she is working allows the student to see the instructor and the instructor's markings overlaid on the student's paper, giving the impression that the instructor is present and collaborating on the student's work. Videoconferencing and communication-management subsystems facilitate communication between the instructor and the student(s) during this collaboration.

1 Claim, 4 Drawing Sheets

SYSTEM FOR INTERACTIVE ONLINE COLLABORATION

This application claims priority from and the benefit of the filing date of application No. 62/632,347 filed Feb. 19, 2018, the disclosure of which is incorporated herein.

BACKGROUND OF THE INVENTION

1. Field of the Invention

The present invention relates to educational technology and more particularly, to distance learning. More particularly, the present invention is in the technical field of live interactive distance learning.

2. Description of the Prior Art

Educational technology is the effective use of technological tools in learning. An array of tools, such as media, machines and networking hardware, has been applied to educational objectives.

Electronic educational technology has become an important part of society today. Educational technology includes (and is broadly synonymous with) e-learning, instructional technology, information and communications technology (ICT) in education, EdTech, learning technology, multimedia learning, technology-enhanced learning (TEL), computer-based instruction (CBI), computer managed instruction, computer-based training (CBT), computer-assisted instruction or computer-aided instruction (CAI), internet-based training (IBT), flexible learning, web-based training (WBT), online education, virtual education, personal learning environments, networked learning, virtual learning environments (VLE) (which are also called learning platforms), m-learning, and digital education. These labels have been variously used and understood and conflate to the broad domain of educational technology and e-learning. These descriptive terms individually emphasize a particular digitization approach, component, or delivery method.

Theoretical perspectives and scientific testing may influence instructional design. The application of theories of human behavior to educational technology derives input from instructional theory, learning theory, educational psychology, media psychology, and human performance technology.

Educational technology includes numerous types of media that deliver text, audio, images, animation, and streaming video and includes technology applications and processes such as audio or video tape, satellite TV, CD-ROM, and computer-based learning as well as local intranet/extranet and web-based learning. Information and communications systems, whether free-standing or based on either local networks or the Internet in networked learning, underlie many e-learning processes.

Educational technology and e-learning can occur in or out of the classroom. It can be self-paced, asynchronous learning or may be instructor-led, synchronous learning. It is suited both to distance learning and to face-to-face teaching, the combination of which is termed blended learning. Educational technology is used by learners and educators in homes, schools (both K-12 and higher education), businesses, and other settings.

Virtual learning in a narrowly defined semantic sense implies entering the environmental simulation within a virtual world. A virtual education course refers to any instructional course in which all, or at least a significant portion, of the course is delivered by the Internet. "Virtual" is used in that broader way to describe a course that is taught not in a classroom face-to-face but through a substitute mode that can conceptually be associated "virtually" with classroom teaching, which means that people do not have to go to the physical classroom to learn. Accordingly, virtual education refers to a form of distance learning in which course content is delivered by various methods such as course management applications, multimedia resources, and videoconferencing. Students and instructors communicate via these technologies.

Early e-learning systems, based on computer-based learning/training, often replicated autocratic teaching styles whereby the role of the e-learning system was assumed to be for transferring knowledge, as opposed to systems developed later based on computer-supported collaborative learning (CSCL), which encouraged the shared development of knowledge.

Videoconferencing was an important forerunner of the educational technologies known today. Disadvantages of this form of educational technology are readily apparent: video quality is often grainy/pixilated; videoconferencing requires setting up a type of mini-television studio for broadcast, causing space to become an issue; and specialized equipment is required for both the provider and the participant.

Due in part to technical advancements in low-cost hardware and network access bandwidth, online education is rapidly increasing and is becoming as viable an alternative as traditional classrooms. According to a 2008 study conducted by the U.S. Department of Education, during the 2006-2007 academic year about 66% of postsecondary public and private schools participating in student financial-aid programs offered some distance-learning courses. In 2008, the Council of Europe passed a statement endorsing e-learning's potential to drive equality and education improvements across the European Union.

Today, the prevailing paradigm is computer-mediated communication (CMC), in which the primary interaction is between learners and instructors, mediated by the computer. Computer-based training relies on individualized (self-study) learning, while CMC involves educator/tutor facilitation and requires scenarization of flexible learning activities. In addition, current information and communications technology may provide educators with tools for sustaining learning communities and associated knowledge-management tasks.

Students growing up in this digital age have extensive exposure to a variety of media. Major high-tech companies such as Google, Apple, Verizon, and Microsoft are funding schools to provide them the ability to teach their students through technology, which may lead to improved student performance.

E-learning may be either synchronous or asynchronous. Synchronous learning occurs in real-time, with all participants interacting at the same time, while asynchronous learning is self-paced and allows participants to engage in the exchange of ideas or information without the dependency of other participants' involvement at the same time.

Synchronous learning refers to the exchange of ideas and information with one or more participants during the same period. Examples are face-to-face discussion, online real-time live teacher instruction and feedback, video-conference conversations, and chat rooms or virtual classrooms where everyone is online and working collaboratively at the same time.

Asynchronous learning may use technologies such as email, blogs, wikis, and discussion boards as well as web-supported textbooks, hypertext documents, audio/video courses, and social networking using Web 2.0. At the professional-education level, training may include virtual operating rooms. Asynchronous learning is particularly beneficial for students who have health problems or childcare responsibilities that make regularly leaving the home to attend lectures difficult. They have the opportunity to complete their work in a low-stress environment and within a more flexible timeframe. In asynchronous online courses, students proceed at their own pace. If they need to listen to a lecture a second time, or think about a question for a while, they may do so without fearing that they will hold back the rest of the class. Through online courses, students can earn their diplomas more quickly, or repeat failed courses without the embarrassment of being in a class with younger students. Students have access to an incredible variety of enrichment courses in online learning and can participate in college courses, internships, sports, or jobs and still graduate with their class.

Computer-supported collaborative learning (CSCL) uses instructional methods designed to encourage or require students to work together on learning tasks.

CSCL uses blogs, wikis, and cloud-based document portals (such as Google Docs and Dropbox). With technological advances, sharing information between multiple people in a network has become much easier and use has increased.

Locus of control remains an important consideration in successful engagement of e-learners. The continuing attention to aspects of motivation and success in regard to e-learning should be kept in context and concert with other educational efforts. Information about motivational tendencies can help educators, psychologists, and technologists develop insights to help students perform better academically.

Many conventional e-learning systems are based on instructional packets, which are delivered to students using assignments. Assignments may be evaluated by the teacher. More recently, e-learning systems have increased emphasis on social learning and the use of social software such as blogs, wikis, podcasts and virtual worlds.

Education can be enhanced by collaboration and engagement. Educational collaboration has been affected by social networking such as Skype, Facebook, Instagram, etc.

Webcams and webcasting have been used in educational settings and enable creation of virtual classrooms and virtual learning environments. Likewise, interactive whiteboards and smartboards allow learners and instructors to write on touch surfaces. Screen markup can be on either a blank whiteboard or any computer screen content. Depending on permission settings, this visual learning can be interactive and participatory, including writing and manipulating images on an interactive whiteboard.

Screencasting allows users to share their screens directly from their digital devices and make the video available online so that other viewers can stream the video directly. The presenter thus has the ability to show his or her ideas and flow of thoughts rather than simply explain them as simple text content. In combination with audio and video, an educator can mimic the one-on-one experience of the classroom and deliver clear, complete instructions. Learners may have the ability to pause and rewind and review at their own pace, something a classroom cannot readily offer.

Virtual learning environments are used to simulate a virtual classroom or meeting by simultaneously mixing several communications technologies. For example, web conferencing software such as GoToTraining, WebEx Training, and Adobe Connect may enable students and instructors to communicate with each other via webcam, microphone, and real-time chat in a group setting. Participants can raise their hands, answer polls, and take tests. Students are able to whiteboard and screencast when given rights by the instructor, who sets permission levels for text notes, microphone rights, and mouse control.

A virtual classroom provides an opportunity, albeit limited, for students to receive direct instruction from a qualified teacher in an interactive environment. Learners can have direct and immediate access to their instructor for instant feedback and direction. A virtual classroom may provide a structured schedule of classes, which can be helpful for students who may find the freedom of asynchronous learning to be overwhelming. In addition, a virtual classroom with sufficient interactivity features can provide a social learning environment that replicates the traditional "brick and mortar" classroom. Most virtual-classroom applications provide a recording feature. Each class is recorded and stored locally or on a server, which allows for instant playback of any class over the course of the school year. This can be extremely useful for students to review material and concepts for an upcoming exam. This feature provides students with the opportunity to watch any class that they may have missed, so that they do not fall behind. Moreover, parents and auditors have the ability to monitor any classroom to ensure that they are satisfied with the education the learner is receiving.

Internet-based learning management systems (LMS) include Canvas, Blackboard Inc., and Moodle. These types of LMS allow educators to run a learning system partially or fully online, asynchronously or synchronously. Blackboard and Eliademy are network-based, cloud-based course management systems.

Benefits of incorporating technology into learning may include improved open access to education, better integration for non-full-time students, improved interactions between students and instructors, reduced travel costs, and easy-to-access course materials.

Although some aspects of a classroom setting are missed by using these resources, these resources are helpful tools for adding additional support to the educational system.

Interactive whiteboards may use one of several types of sensing technology to track interaction on the screen surface: resistive, electromagnetic, infrared, laser, ultrasonic, and camera-based (optical).

Resistive touchscreens may be composed of two flexible sheets coated with a resistive material and separated by a micro-thin air gap. When contact is made with the surface of the touchscreen, the two sheets are pressed together, registering the precise location of the touch. This technology allows one to use a finger, a stylus, or any other pointing device on the surface of the screen.

An active electromagnetic board is a whiteboard that features an array of wires embedded in the board surface that interacts with a coil in the stylus tip to determine the (x, y) coordinate of the stylus. Styli are either active (require a battery or wire back to the whiteboard) or passive (alter electrical signals produced by the board but contain no batteries or other power source). There may be magnetic sensors in the board that react and send a message back to the computer when they are activated by a magnetic pen.

Passive electromagnetic boards do not contain the sensing technology in the boards themselves but in the pens. Tiny magnetic fibers are embedded in the whiteboard and form a pattern that an electromagnetic coil in the pen is able to sense. Therefore, the pen is able to calculate its location on the whiteboard and sends this information to a computer.

Capacitive whiteboards work with an array of wires behind the board. The wires interact with fingers touching a screen. The interaction between the different wires and the tip of the finger is measured and calculated to an (x, y) coordinate. Other types of whiteboards include projected capacitive, which uses an indium tin oxide (ITO) grid sandwiched between clear film or transparent electrodes replacing the ITO. There are also other whiteboard technologies in use.

There exist certain virtual writing systems that use capacitive devices like touchscreens to transmit writing from one user's touchscreen device to another user's touchscreen device (e.g., US Patent Application Publication 2012/0254773 to Viswanathan). In such cases, users enter writing directly on the touchscreen devices through, for example, a drawing toolbar or a handwriting toolbar on, for instance, an e-canvas. Users' marks are translated into digital signals that can be transmitted as images of drawing and writing for other users to view on their electronic devices or with the aid of a projector. However, such systems do not allow users (e.g., students) to transmit images simply by writing on common paper (rather than on an e-canvas) with a common writing implement like a pen or a pencil (rather than with a capacitive device like a touchscreen or other tactile-actuated sensor as described by Howell in U.S. Pat. No. 5,767,897), nor do they allow other users (e.g., instructors) to virtually appear on or annotate said paper.

Likewise, there exist certain electronic education systems (e.g., U.S. Patent Application Publication 2016/0148522 to Rowland) that facilitate collaboration between instructors and students. A student may interact with on-screen assignments, and an instructor or a classmate may view and respond to such interactions by, among other things, providing annotations beside on the student's work. Such systems include management features that allow instructors to monitor and control multiple students' access at once, if desired. However, such systems do not allow students to transmit images simply by writing on common paper with a common writing implement like a pen or a pencil, nor do they allow instructors to virtually appear on or annotate said paper.

There do exist certain systems that allow an instructor to view a student's paper and to make virtual annotations on said paper (e.g., U.S. Patent Application Publications 2016/0049082 and 2017/0236435 to Leatherman), but such systems require cumbersome and costly equipment. The instructor needs a projector, an infrared-transmitting device such as an infrared pen for making annotations, an infrared sensor for tracking and recording said annotations (said pen and sensor together constituting a stand-alone interactive whiteboard system), and a computer to process and view said annotations, while the student needs a computer to see his or her paper and the instructor's overlaid annotations and may also need a document camera to transmit to the instructor a live image of his or her paper.

Augmented reality is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e., additive to the natural environment) or destructive (i.e., masking of the natural environment) and is interwoven with the physical world such that it is perceived as an immersive aspect of the real environment. In this way, augmented reality alters one's ongoing perception of a real-world environment. Augmented reality is sometimes referred to as mixed reality or computer-mediated reality. At present, augmented reality generally requires costly specialized, cutting-edge processors and image sensors in devices such as a high-end smartphones.

Background subtraction is a field of computer vision and image processing whose aim is to detect changes in image sequences. Background subtraction is any technique which allows an image's foreground to be extracted for further processing (e.g., for object recognition) while the background image, which is often static, is removed. Background subtraction is used for detecting moving objects in video sequences filmed with static, or stationary, cameras.

Depth cameras, sometimes called "3D" cameras, use depth sensors to attach depth information, often derived through triangulation, to moving images filmed with conventional image sensors. Such cameras are often used to construct three-dimensional images. In addition, the depth information they provide can be used by software programs to differentiate between foreground and background objects. Using such information, said software program can, among other things, execute background subtraction. 3D cameras may be contrasted with common cameras (sometimes colloquially referred to as RGB cameras) that do not use depth sensors.

As described, existing tools allow online teachers to write on virtual whiteboards, transmit video images of their own writing on paper, chalkboards, or other media, and the like. Similarly, existing tools allow students in online classes to write on virtual whiteboards or transmit video images of their own writing on paper, chalkboards, or other media. Existing tools, however, do not provide a way for teachers to appear or write on a pupil's paper virtually (at least not without cumbersome and costly equipment), meaning that online classes suffer from the inability of teachers and students to interact easily and cheaply in real time on the same paper or in the same workbook as they would if they were collaborating together in person.

SUMMARY OF THE INVENTION

The prior-art systems do not permit a remote virtual instructor to "appear" or "write" on a student's paper easily and cheaply. Pointing at and writing on a student's paper is an aspect of live in-person tutoring or teaching that is missed by use of remote conferencing and currently available interactive whiteboards and screen sharing.

It is an object of the invention to provide interactive online collaboration for education and other fields.

It is an object of the invention to eliminate the need for an e-canvas for the student to write on in order to transmit images of his or her writing to an instructor and/or classmates.

It is an object of the invention to make the setup required at a student site simple, without the need for a document camera to capture images of the student's writing on paper or a computer to display images of the student's writing with the instructor's image and annotations, and to make the setup required at an instructor site simple, without the need for a projector to project onto a writing surface such as a desk or table an image of the student's paper or other physical medium and the student's writing thereon, or a stand-alone interactive whiteboard system to make annotations upon said image.

It is an object of the invention to permit a remote virtual instructor to "appear" or "write" on a student's paper with both parties using only commonly available hardware—namely, a touchscreen computer, tablet, or smartphone in the case of the instructor and a smartphone in the case of the student—plus common paper and pen or pencil.

It is an object of the invention to approximate augmented reality to allow a remote instructor to "appear" and "write" on a student's paper without the need for costly devices with advanced sensors and processors that are normally required for background-subtraction and augmented-reality applications. According to an advantageous implementation, a student needs only a common smartphone with a common "2D" camera and no special augmented-reality sensors or processors, and the instructor needs only a common laptop, tablet, or smartphone with a common "2D" camera and touchscreen and no special augmented-reality sensors or processors.

It is an object of the invention to more accurately simulate live instruction using educational technology to facilitate remote instruction.

It is an object of the invention to simulate live tutoring, live instruction, and live collaboration.

It is an object of the invention to simulate an instructor in a remote location appearing and writing on a paper at the student's location.

It is an object of the invention to provide an online instructional system for teachers, tutors, professors, and other instructors to use to appear and write virtually on a pupil's paper, book, or other physical medium. According to an advantageous feature, the system allows instructors and students to interact virtually on the same paper, book, or other physical medium, approximating the effect of writing on the same physical medium as might occur when instructor(s) and student(s) work together in person.

A virtual writing system for use in synchronous collaboration may be provided to allow a user at a "virtual writing station" to view an image of a document that may be written on with a common writing implement such as a pen or pencil at a "document station" remote from said user, who may write virtually on the document by using the system's annotation subsystem. An image of the document, including actual writing and the virtual writing, may be displayed at both stations. Advantageously the image(s) may be video images but could be one or more still images. The virtual writing station may be a personal computing or mobile communications device (for example, a laptop, tablet, or smartphone) having an input device such as a mouse, trackpad, or, preferably, a touchscreen; a camera, microphone, and speaker(s); a background-subtraction subsystem; a videoconferencing subsystem; an image-sharing subsystem; a screen-sharing subsystem; a communication-management subsystem; and said annotation subsystem. The camera, videoconferencing subsystem, and background-subtraction subsystem may allow the user at the virtual writing station to superimpose his or her live image over the live image of the document. The annotation subsystem may allow the user at the virtual writing station to annotate the image, received through the image-sharing subsystem, to create virtual writings on the image. The screen-sharing subsystem may be used to display a combination of the image of the document and the representation of said user's image and annotations to the second user at a document station remote from the virtual writing station. The communication-management subsystem may allow the user at the virtual writing station to control (e.g., stop, start, or adjust) the audio and video transmissions of the user at the document station when both users have activated the videoconferencing subsystem and the image-sharing subsystem. The annotation subsystem may also allow the user at the virtual writing station to make writing and other marks visible to the user at the document station on a common whiteboard visible on both users' devices (for example, when the user at the virtual writing station chooses not to virtually annotate the paper or other physical medium of the user at the document station but rather wants simply to transmit marks written on his or her whiteboard).

The document station may have a mobile communications device (e.g., a smartphone with a built-in camera) with a videoconferencing subsystem, an image-sharing subsystem, a screen-sharing subsystem (to receive screen-sharing images from the virtual writing station), a communication-management subsystem, and an annotation subsystem. Advantageously, the front-facing camera of the device is connected to the videoconferencing subsystem, while the rear-facing camera of the device is connected to the image-sharing subsystem. The document station may be configured to transfer the image(s) captured by a camera on the device over one or more communication channels (i.e., a videoconferencing and/or image-sharing subsystem) to the virtual writing station. The virtual writing system may be configured to display the annotations of the user of the virtual writing station and the superimposed image of the user of the virtual writing station along with the received image, and the screen-sharing subsystem is configured so that the document station displays what is on the screen of the virtual writing station—that is, the image of the document with the superimposed image and annotations of the user of the virtual writing station (or other annotations made by the user of the virtual writing station on a whiteboard or any document on his or her screen, should said user choose not to annotate the work of the user of the document station). Both stations may have one or more monitors or other display devices (advantageously, the displays of the personal computing or mobile communications devices themselves at said stations) for displaying the document or other image, the annotations, or the image of the instructor after background subtraction; advantageously, a combination thereof; and/or a conventional videoconference between users. Like the virtual writing station, the document station station may have a conventional microphone, speaker(s), and video camera suitable for use in conventional videoconferencing using the videoconferencing subsystem.

Importantly, the current invention eliminates the need for a document camera and its purchase and installation. The document station is connected by a communications channel to the virtual writing station. The document station includes a mobile communications device such as a smartphone with one or more cameras and a display. The mobile communications device with one or more cameras and a mobile image-sharing subsystem associated with the document station serves in place of a document camera. The mobile device may be configured for the camera to capture one or more images and transmit one or more images captured by the camera from the mobile communications device to the image-sharing subsystem of the virtual writing station. These images may be live video images. The document station may also be configured to receive one or more images from the screen-sharing subsystem of the virtual writing system and display the one or more images on a document station display, which advantageously is the display of the mobile communications device itself. The document station may also have a videoconferencing subsystem with a camera, speaker, and microphone for conventional videoconferencing with the virtual writing station.

Advantageously, at the virtual writing station the current configuration eliminates the need for a physical interactive whiteboard system or a display/projection surface as a desktop surface emulating a piece of writing paper. A touchscreen on the personal computing or mobile communications device (i.e., a laptop, tablet, or smartphone) is sufficient to translate user interaction with the annotation subsystem of the virtual writing station. The annotations may be displayed by screen sharing to the document station. Both stations may also include videoconferencing cameras, speakers, and microphones.

According to an advantageous feature, users may selectively control the images and audio displayed on their own and/or the other station(s).

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

A clear understanding of the key features of the invention summarized above may be had by reference to the appended drawings, which, not necessarily drawn to scale, illustrate the method and system of the invention, although it will be understood that such drawings depict preferred embodiments of the invention and therefore are not to be considered as limiting its scope with regard to other embodiments which the invention is capable of contemplating. Accordingly.

DETAILED DESCRIPTION OF THE PREFERRED EMBODIMENT

Various objects, features, aspects, and advantages of the present invention will become more apparent from the following detailed description of preferred embodiments of the invention, along with the accompanying drawings in which like numerals represent like components.

Before the present invention is described in further detail, it is to be understood that the invention is not limited to the particular embodiments described, as such may, of course, vary. It is also to be understood that the terminology used herein is for the purpose of describing particular embodiments only and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention.

According to an embodiment of the invention, there may be a station (FIG. 2) configured for use with a physical writing surface, such as paper. This "document station" advantageously may be used by a student.

According to an embodiment of the invention, there may be another station (FIG. 1) configured for a user remote from the other station to virtually "appear" and "write" on said physical writing surface. This "virtual writing station" advantageously may be used by an instructor.

According to an embodiment of the invention, both stations may be configured to allow online interactive collaboration and connected by a communications link (for example, a LAN, WLAN, point-to-point, or Internet communications link).

Figure 1:
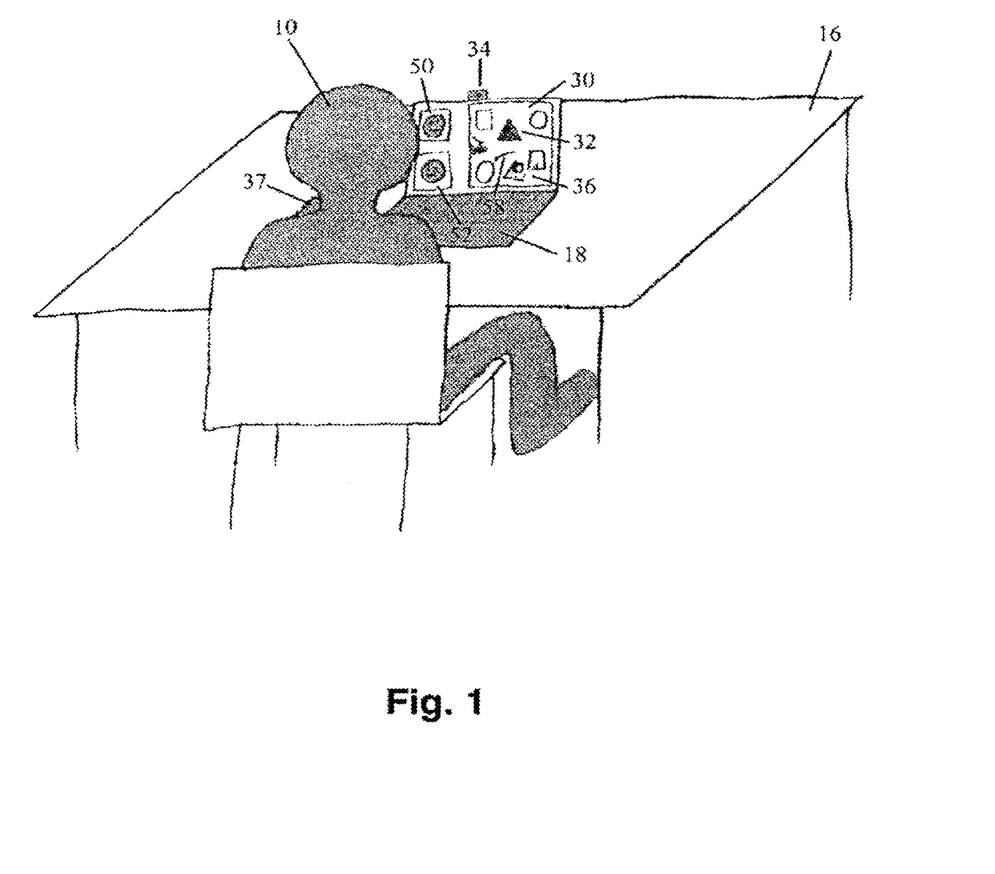
FIG. 1 is a perspective view of an implementation of the present invention by an instructor (that is, the "virtual writing station" referenced above).
Figure 2:
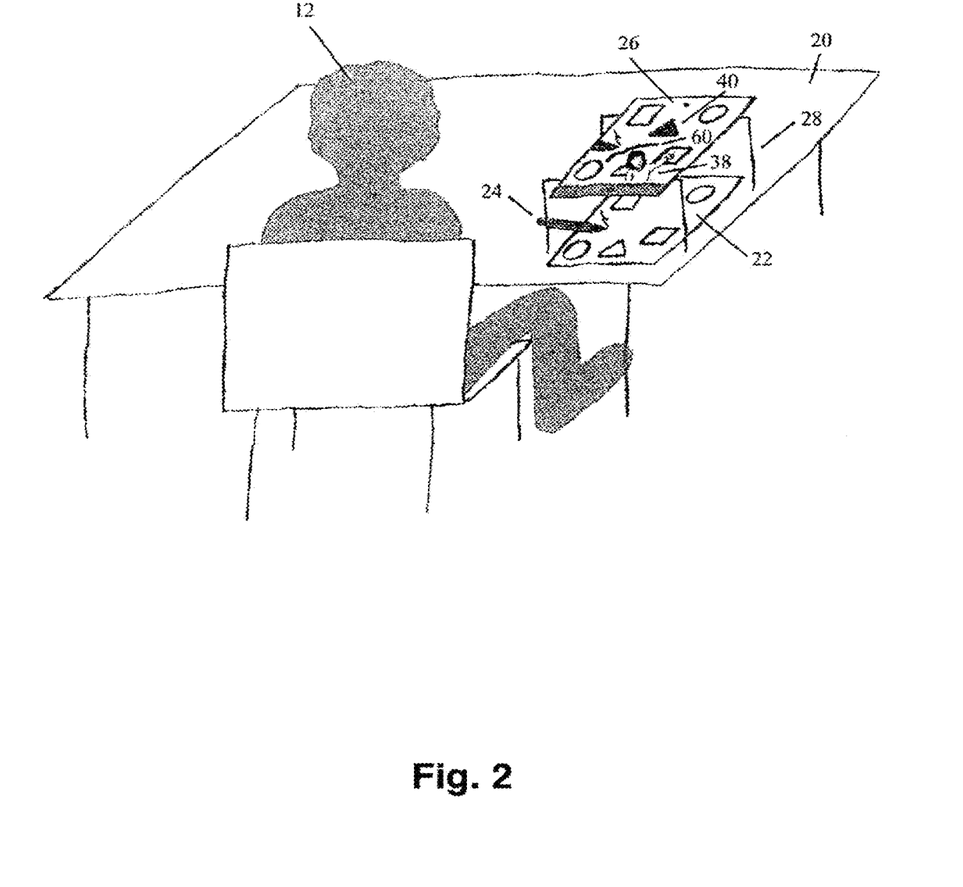
FIG. 2 is a perspective view of an implementation of the present invention by a student with whom the instructor is collaborating virtually on said student's paper or other physical medium (that is, the "document station" referenced above).
Figure 3:
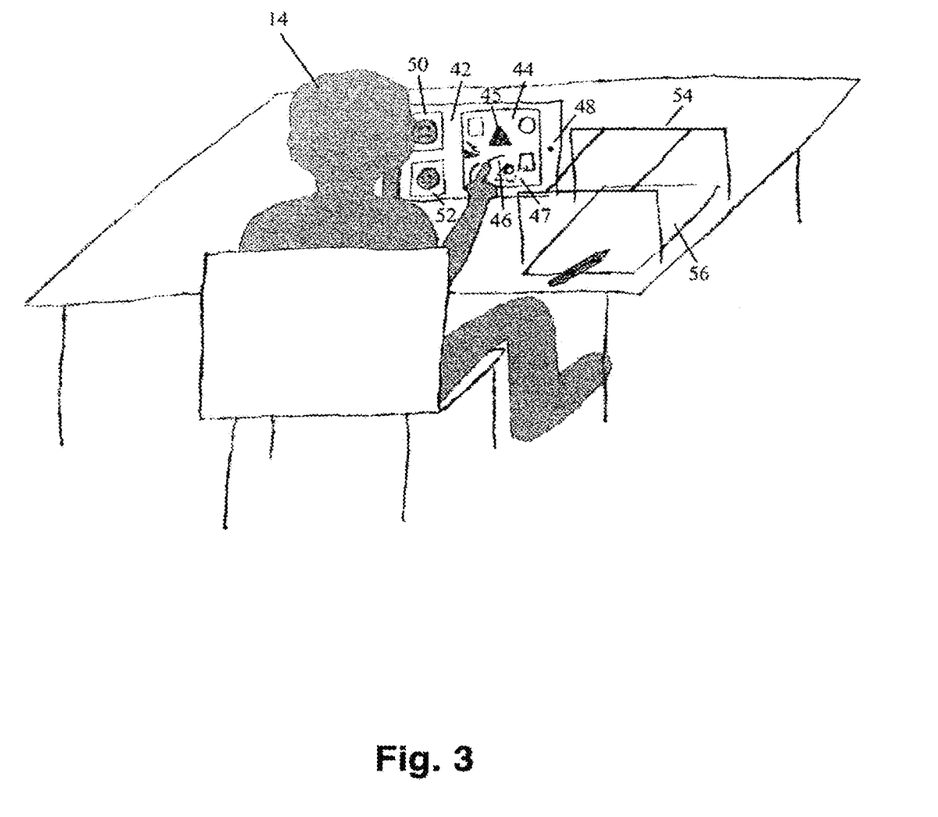
FIG. 3 is a perspective view of an implementation of the present invention by a participant observing and joining in the collaboration between the instructor and the student.

Referring now to the invention in more detail, in FIGS. 1-3 there are shown an instructor 10 and a student 12 engaged in interactive virtual collaboration on the student's paper 22 using the present invention in a preferred embodiment, with another participant 14 observing the interaction. In this embodiment the instructor 10, the student 12, and the participant 14 are not necessarily located in the same room or place.

In one mode of operation, the student 12 can work a problem in pen or pencil 24 and paper 22 at the document station 90 while the instructor 10 is hearing the student 12, who has a microphone 84, through the speaker(s) 64 of the instructor's device 18 and speaking back to the student 12, who has one or more speakers 86, through the microphone 66 through the videoconferencing subsystem 62. Importantly, the instructor 10 at the virtual writing station 88 may see an image 30 of the paper 22 (or of anything else) captured by a camera 68 of the device 26 at the document station 90, and virtually write 32 on the image 30 for display on the screens 70, 72 of the devices 18, 26 at the virtual writing station 88 and the document station 90 respectively.

In the embodiment in the appended drawings, the instructor 10 is seated at a table 16 with a personal computing or mobile communications device 18 such as a laptop (which may be a Windows or Macintosh device, for example) or a smartphone or tablet (which may be an Android or iOS device, for example) on which the software components (i.e., the background-subtraction 74, videoconferencing 62, image-sharing 76, screen-sharing 78, communication-management 80, and annotation 82 subsystems) of the invention are installed. The student 12 with whom the instructor 10 is collaborating is also seated at a table 20 with paper (or other physical medium) 22 and a writing implement 24, such as a pen or a pencil, which he or she uses to mark the paper 22. Above (and parallel to) the student's paper 22 is a mobile communications device 26 such as a mobile phone or tablet with the appropriate software components of the invention (namely, the videoconferencing 62, image-sharing 76, screen-sharing 78, and communication-management 80 subsystems) supported by a stand 28 that positions the mobile communications device 26 in such a way that its rear camera 68 faces down at the student's paper 22. Of note is that said device 26 and said rear camera 68 do not need to have any special sensors or processors for handling augmented-reality applications; they simply need to be capable of transmitting standard video (sometimes colloquially called RGB video).

In more detail, still referring to the invention of FIGS. 1-4, the live image 30 of the student's paper 22 is transmitted to the instructor's personal computing or mobile communications device 18 virtually through the image-sharing subsystem 76 of the invention. This image 30 becomes a virtual representation of the student's paper 22 on which the instructor 10 can virtually make visible mark(s) 32 using an input device on his or her personal computing or mobile communications device 18 such as a mouse, a trackpad, or, preferably, a touchscreen using the annotation subsystem 82, which converts output from said input device into said visible mark(s) 32, commonly known as annotations, which appear on the screen 70 of the instructor's personal computing or mobile communications device 18. Moreover, the background-subtraction subsystem 74 allows the camera 34 of the instructor's computing or communications device 18 to overlay a movable, resizable image 36 of the instructor 10 on the screen 70 of the instructor's device 18, with said image advantageously placed directly on the image 30 of the student's paper 22 (for instance, allowing the instructor 10 to point with his or her hand 37 to marks on the student's paper 22). The simultaneous display on the screen 70 of the instructor's computing or communications device 18 of the annotations 32 created by the instructor 10, the image 36 of the instructor 10 himself or herself, and the image 30 of the student's paper 22 creates, for the instructor 10, the impression that he or she is appearing and writing on the student's paper 22, as if he or she were sitting with the student 12 at the student's table 20 and engaged in in-person collaboration on the student's paper 22. The image(s) of the annotation(s) 32 created by the instructor 10, the image 36 of the instructor 10 himself or herself, and the image 30 of the student's paper 22, all on the screen 70 of the instructor's device 18, are transmitted back to the student's mobile communications device 26 via the screen-sharing subsystem 78 of the invention and appear on the screen 72 of the student's communications device 26 mounted above the student's paper 22. This creates, for the student 12, who is indirectly viewing his or her paper 22 on the screen of his or her electronic communications device 26 as if through a window, the impression, through an approximation of augmented reality, that the instructor 10 is appearing 38 and writing 40 on the student's paper 22, as if the instructor 10 were sitting with the student 12 at the student's table 20 and pointing and writing on the student's paper 22 in person.

Meanwhile, a participant 14 can observe (on the screen of his or her mobile communications device 42 with the videoconferencing 62, image-sharing 76, screen-sharing 78, communication-management 80, and annotation 82 subsystems of the invention installed) the image 44 of the instructor 10 and the student 12 collaborating on the paper 22 of the student 12. Moreover, the annotation subsystem 82 allows not just the instructor 10 but also the participant 14 to mark the student's paper 22 by drawing annotations 46 with the touchscreen of his or her mobile communications device 42 while the image 44 of the student's paper 22 (with the annotations 45 and image 47 of the instructor 10) is displayed on said device. The annotations 46 of the participant/observer 14 are sent through the annotation subsystem 82 to the screen 70 of the personal computing or mobile communications device 18 of the instructor 10 and appear as annotations 58, 60 on the displays 70, 72 of the devices 18, 26 of the users of the virtual writing station 88 and the document station 90 and on the displays of the devices of any other participants/observers (not shown). As such, not only the instructor 10 but also any participant 14 can annotate the paper 22 of the student 12.

The front-facing camera 48 of the participant's mobile communications device 42 transmits to the instructor's personal computing or mobile communications device 18 a live image 50 of the participant 14 through the videoconferencing subsystem 62. Likewise, yet another participant (not shown) with the appropriate subsystems of the invention installed on his or her mobile communications device (not shown) can observe the interactions between the instructor 10, the student 12, and the participant 14 and, using the videoconferencing subsystem 62, can transmit to the others' personal computing or mobile communications devices 18, 26, 42 a live image 52 (and live sound) of himself or herself, so that multiple participants can observe the collaboration between the instructor 10 and the student 12 and can be visible (and audible) to the instructor 10 and to each other. The number of such participants need not be limited.

Each participant 14 has a stand 54 above his or her paper 56 on which he or she can lay his or her mobile communications device 42 to transmit a live image (not shown) of his or her paper 56 to the instructor 10, allowing the instructor 10 to appear on the image (not shown) of the paper 56 on the screen of said device 42 and allowing both the instructor 10 and other students/participants with the appropriate subsystems of the invention installed on their devices to annotate said image (not shown) as described above.

As such, multiple students can share images of their papers with an instructor 10 and with each other at once, and all the students and the instructor 10 can simultaneously see the annotations made by the instructor 10 and by each other. In other words, the system for interactive online collaboration is not limited to one instructor annotating one student's paper at a time; the image-sharing subsystem can transmit live images of multiple students' papers to the instructor's screen for simultaneous on-screen annotation by the instructor and by fellow students/participants with whom the instructor has shared his or her screen.

If the instructor 10 desires, he or she can transmit live video of himself or herself through the videoconferencing subsystem 62 conventionally. That is, he or she can appear in a video window like those 50, 52 in which participants appear, rather than being superimposed 36, 38, 47 on the image 30, 44 of the paper 22 of a student 12.

Similarly, whenever a student 12 desires not to collaborate with the instructor 10 and/or other participant(s) 14 on said student's paper 22, said student 12 can disable the image-sharing subsystem 76. Doing so automatically deactivates the rear camera 68 of said student's device 26 and activates the front (user-facing) camera 48 of said device, allowing the student to transmit a live video image of himself or herself (not shown) through the videoconferencing subsystem 62. In other words, operation of the front 48 and rear 68 cameras of the student's device 26 is mutually exclusive: only one of the two cameras is active at any given moment. Still, using his or her microphone 84, the student 12 can transmit audio through the videoconferencing subsystem 62 regardless of whether the front 48 or rear 68 camera of his or her device 26 is active (that is, regardless of whether the student 12 has activated or deactivated the image-sharing subsystem 76).

Figure 4:
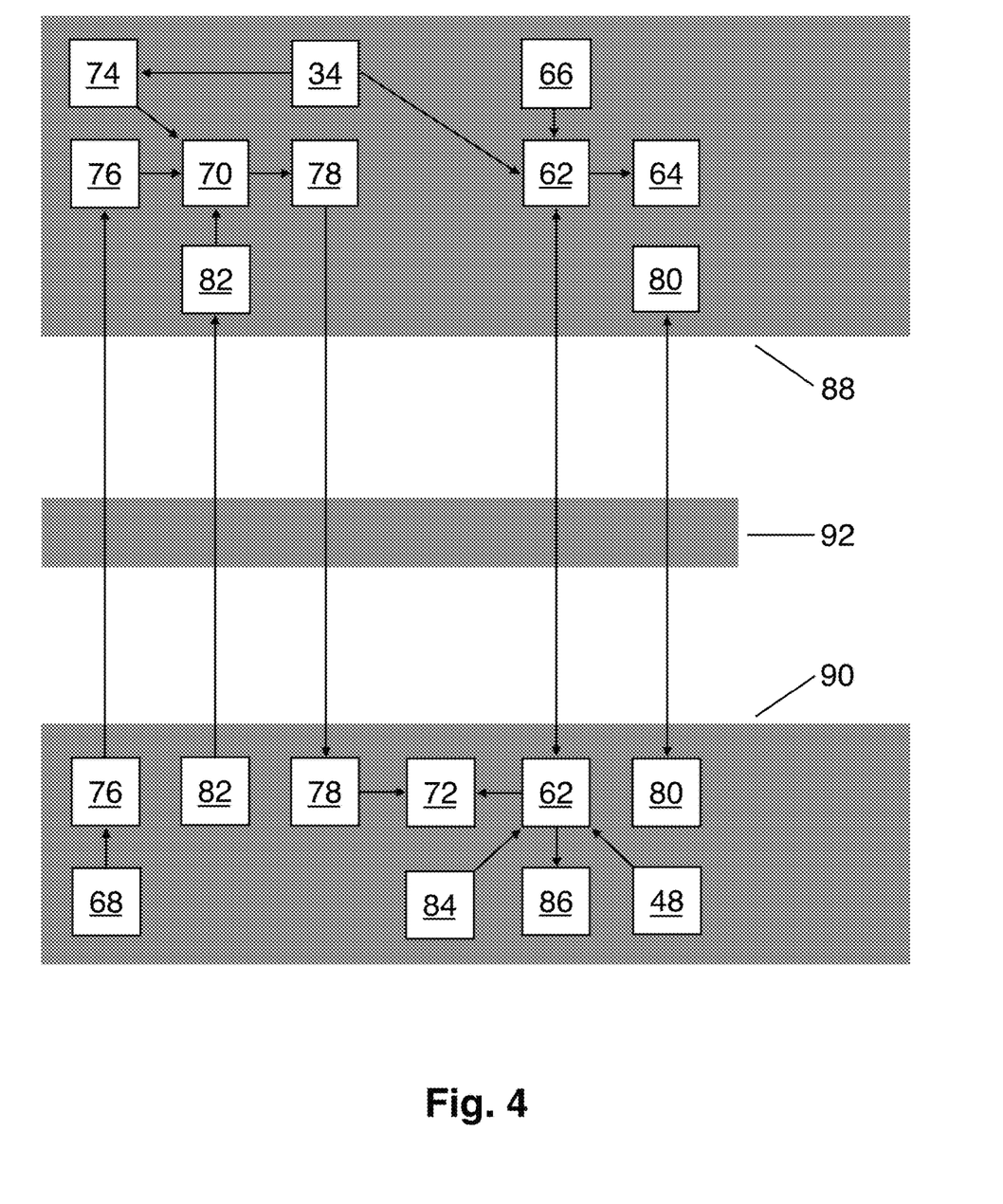
FIG. 4 illustrates a schematic configuration of the various components of the present invention.

The various subsystems of the virtual writing station 88 are connected to the respective subsystems of the document station 90 through a communications link 92.

The construction details of the invention as shown in FIGS. 1-4 are that various components of the system for interactive online collaboration may be made of computer code, for example from software-development kits for videoconferencing, image sharing, screen sharing, annotation, communication management, and background subtraction. Further, the various components of said system and the tools used in its preferred embodiment can be made of different materials appropriate for the uses described above.

The advantages of the present invention include, without limitation, the ability of an instructor to appear and write virtually on a student's book, paper, or other physical medium, regardless of where the instructor and the student are located, as if the instructor were sitting with the student at the student's table, and for fellow students to see and virtually annotate each other's papers, to facilitate collaboration as if dispersed students were working together in the same place. This can all be accomplished with common hardware that instructors and students often already possess (namely, a basic personal computing or mobile communications device, pencil or pen, and paper), without requiring specialized hardware such as writing tablets, document cameras, specialized sensors, or advanced personal computing or mobile communications devices normally necessary for augmented reality.

Although the preceding description contains significant detail, it should not be construed as limiting the scope of the invention but rather as providing illustrations of a preferred embodiment of the invention. For example, although the preceding detailed description refers to the use of the present invention between one instructor and one student, with one or more observer-participants, it will be apparent to one of ordinary skill in the art that the present invention may be practiced without these specific limitations and that the present invention serves to allow an instructor to interact at the same time with the physical media of more than one student, as in a group or classroom setting, with multiple students' papers able simultaneously to be viewed and annotated by the instructor and fellow students.

Therefore, in broad embodiment, the present invention is a system for interactive online collaboration that allows an instructor to appear and write virtually on at least one student's book, paper, or other physical medium, regardless of where the instructor and the student(s) are located, as if the instructor were sitting with the student(s) at the same table or were otherwise collaborating with the student(s) on the same physical medium in the same physical classroom, and allows fellow students to see and annotate each other's papers virtually, with all participants (instructors, students, and observers) also able to see and hear each other in real time.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. For instance, one can imagine uses in fields like interior design, in which a client with a smartphone and tripod could send live video images of his or her home to a designer, who could point to and write on objects in the video feed received from and transmitted back to the client, such that the client could see in the video feed transmitted back to him or her the designer pointing to and annotating objects in the client's house, giving the impression through an approximation of augmented reality that the designer is collaborating with the client in person as the client views his or her home through the real-time images on his or her smartphone's screen that include the designer pointing to and/or annotating objects in the client's home.

Those of ordinary skill in the art will recognize that the scope of the invention is not limited to these specific embodiments or components described herein. Other suitable or equivalent components maybe be utilized without departing from the spirit of the invention.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of collaborational technology have been disclosed. It should be apparent, however, to those skilled in the art that many more modifications besides those already described are possible without departing from the inventive concepts herein. The inventive subject matter, therefore, is not to be restricted except in the spirit of the disclosure.

I claim:

1. A system for interactive online collaboration for education and other fields comprising:
   a. A document station implemented in a first mobile communications device, with said document station further comprising:
      i. a first display screen;
      ii. a first videoconferencing subsystem which is configured to transmit and receive live video images and live audio over the Internet or other computer network;
      iii. a first microphone capable of capturing audio on said mobile communications device for said videoconferencing subsystem;
      iv. a first speaker capable of making audible the audio from said videoconferencing subsystem;
      v. a first user-facing camera capable of capturing video images on said first mobile communications device for said videoconferencing subsystem;
      vi. a first image-sharing subsystem capable of transmitting live video images over the Internet or other computer network;
      vii. a rear-facing camera capable of capturing video images on said mobile communications device for said image-sharing subsystem;

viii. a first screen-sharing subsystem capable of receiving images from another user who has shared his or her screen;
ix. a first annotation subsystem capable of annotating images received through said screen-sharing subsystem;
x. a first communication-management subsystem capable of controlling communication with other users by video, audio, text/chat, or signal; and
xi. a first input device, which may be a touchscreen, on said first mobile communications device capable of transmitting input to said subsystems, wherein said subsystems collectively form the software component of said system for interactive online collaboration on said first mobile communications device of said document station, and a stand or other implement suitable for stably positioning said first mobile communications device above a paper or other physical medium of a student or other participant using said station;

b. A virtual writing station implemented in a second user device comprising a personal computing or mobile communications device, with said virtual writing station further comprising:
i. a second display screen;
ii. a background-subtraction subsystem capable of extracting the real-time image of the user of said virtual writing station by removing a background and maintaining a foreground and placing said image on said second display screen, with said image being movable and resizable;
iii. a second videoconferencing subsystem capable of transmitting and receiving live video images and live audio over the Internet or other computer network;
iv. a second microphone capable of capturing audio on said second user device for said second videoconferencing subsystem;
v. a second speaker capable of making audible the audio from said second videoconferencing subsystem;
vi. a second user-facing camera capable of capturing video images on said second user device for said background-subtraction subsystem and/or said second videoconferencing subsystem;
vii. a second image-sharing subsystem capable of receiving, over the Internet or other computer network, live video images shared by other users of said system for interactive online collaboration;
viii. a second annotation subsystem capable of annotating images received through said second image-sharing subsystem and displayed on the screen of said second user device and/or making annotations elsewhere on said second display screen;
ix. a second screen-sharing subsystem capable of transmitting a combination of images from the background-subtraction, second image-sharing, and second annotation subsystems, or any other still or moving images displayed on said second display screen to the first mobile communications device at the document station as a combined live video image;
x. a second input device, which may be a touchscreen, mouse, or trackpad, on said second user device capable of transmitting input to said subsystems; and
xi. a second communication-management subsystem capable of controlling communication with other users by video, audio, text/chat, or signal, wherein said subsystems collectively form the software component of said system for interactive online collaboration on said personal computing or mobile communications device of said virtual writing station; and c. Physical media and a non-electronic writing implement suitable for marking said media that allow a student or other user(s) of said document station to make marks that a remote instructor or other collaborator using said virtual writing station can appear on, point to, and annotate virtually through said system for interactive online collaboration.

\* \* \* \* \*